R. A. BATES.
VEHICLE WHEEL.
APPLICATION FILED MAY 19, 1917.
1,262,162.
Patented Apr. 9, 1918.
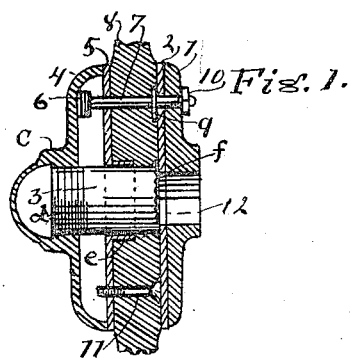
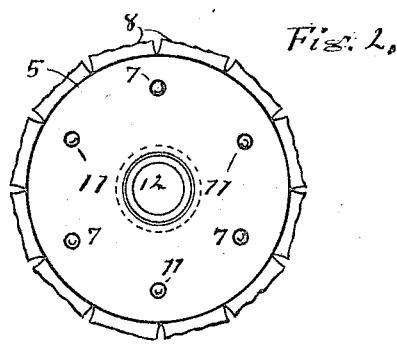
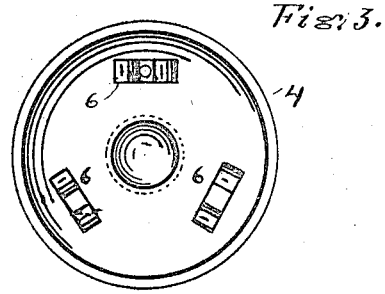
Inventor
Russell A. Bates
By Ithiel J. Cilley
Attorney

UNITED STATES PATENT OFFICE.

RUSSELL A. BATES, OF GRAND RAPIDS, MICHIGAN, ASSIGNOR TO L. D. TAYLOR, OF GRAND RAPIDS, MICHIGAN.

VEHICLE-WHEEL.

1,262,162.	Specification of Letters Patent.	Patented Apr. 9, 1918.

Application filed May 19, 1917. Serial No. 169,783.

*To all whom it may concern:*

Be it known that I, RUSSELL A. BATES, a citizen of the United States, residing at Grand Rapids, in the county of Kent and State of Michigan, have invented certain new and useful Improvements in Vehicle-Wheels, of which the following is a specification.

My invention relates to improvements in caps and coupling devices for the hubs and wheels of automobiles, and its objects are: First, to provide a means whereby a wheel may be easily and readily placed upon, or taken off of its bearings on an axletree. Second, to provide a hub cap for an automobile wheel that may be easily applied or removed, but when in place upon the hub of a wheel will become automatically locked in place in such a manner that there will be no danger of its becoming loose by ordinary wear or usage, and yet it may be readily removed when desired, and, third, to provide the greatest of efficiency with the least amount of expense and trouble in the application of demountable wheels on automobiles and kindred vehicles.

I attain these objects by the mechanism and application of parts shown in the accompanying drawing in which, Figure 1 is a transverse vertical section of a vehicle hub with my devices in place. Fig. 2 is a front elevation of a wheel hub with the cap removed to show the distribution of the several securing elements. Fig. 3 is an inside plan of the hub cap showing the distribution of the locking elements, and, Fig. 4 is a perspective of the locking element or spring that is secured to the hub cap to engage a connecting element on the hub.

Similar reference characters refer to similar parts throughout the several views.

One of the principal objects of my invention arises from the necessity for quick action in changing wheels, in cases of emergency, and to bring about this object successfully I have so arranged my device that I can do away, entirely, with the usual supporting bolts in use for holding the wheel upon the hub, and by simply removing the hub cap the wheel may be removed at once. To bring about this result I have placed a plate 2 against the hub flange 1, and secured it in place by placing bolts, as 7, each having an integral collar 9, to bear upon the surface of the disk or plate 1, and the ends of the bolts pass through the plate and the flange 1 and are secured by means of nuts 10 for holding the plates temporarily in place upon the flange. The plates or disks 2 have hollow hubs 3, integral therewith, which are designed to pass over the end of the axletree, as a skein, and are screw threaded at the ends, as at *d*, so the cap 4 may be firmly screwed onto said hubs or sleeves, as indicated in Fig. 1.

I also provide, in connection with this device, a second plate, as 5, that is secured to the wheel spokes by passing small bolts, as 11, through the spokes and screwing them through the plates 5, as indicated in Figs. 1 and 2, so the plates are firmly secured to the spokes. The hub of the hub cap, at *c*, is so formed that a wrench of proper construction, may be applied thereto to screw the cap 4 firmly in place, and when firmly in place it is held from turning upon the sleeve 3 by any available form of lock. I have found the most available lock for this purpose, and the one most easily and readily applied, to consist of a double winged spring, as 6, which is firmly riveted, or otherwise secured to the inner surface of the cap 4, and extend the bolts 7 through to a position where the ends will be engaged by said springs so that when the cap is being screwed into place the ends of said bolts will press the wings *a*, of the springs back and will be held between the wings, over the body plate *b*, so the cap 4 cannot be revolved in either direction, or even moved revolubly in the least without considerable exertion to disengage the springs from the ends of the bolts 7, so that the wheels are, thus, held securely upon the axletree, yet are readily removed by simply screwing the caps 4 off of the hubs 3, and as easily and readily replaced.

The hub 3 is cut away at *f* for the purpose of showing the plate 2 in section, and the plate 5 is, preferably, provided with an inwardly extending cylindrical hub *e* that is designed to pass over the hub 3 to strengthen the mounting of the plate 5 upon the said hub 3.

12 represents the opening in the hub flange as ordinarily made to pass over the end of the axletree, this flange being old in the art and forming no part of my invention.

What I claim as new, and desire to secure by Letters Patent of the United States, is:

1. In combination with the hub flange of an automobile wheel, a circular plate having an integral cylindrical hub extending from one side and screw threaded at the end, bolts for securing said plate to the hub flange, wheel spokes set adjacent to said plate, a second plate set against the opposite sides of the spokes, means for securing the spokes to the second plate, a hub cap screwed upon the threaded end of the cylindrical hub, pins extending through the spokes and the second plate and projecting beyond the outer surface of the same, and springs mounted inside of the hub cap in position to be engaged by the pins to hold the cap safely in position.

2. In combination with the hub flange of an automobile wheel, a circular plate having a cylindrical hub integral therewith and extending from one side thereof and screw-threaded at the outer end, a second plate having an inwardly extending cylindrical hub integral therewith and adapted to pass closely over the cylindrical hub of the first mentioned plate, wheel spokes placed between the plates, means for securing the first named plate to the hub flange, means for securing the second named plate to the spokes, a hub cap screwed upon the end of the cylindrical hub, springs secured to the inner surface of the hub cap, and pins passed through the first named plate, the spokes and the second named plate and extending outward therefrom into position to engage the springs and hold the caps securely in place.

Signed at Grand Rapids, Michigan May 14, 1917.

RUSSELL A. BATES.